(12) United States Patent
Engelsberg

(10) Patent No.: US 7,250,966 B1
(45) Date of Patent: Jul. 31, 2007

(54) METHOD AND DEVICE FOR DETERMINING A DISPLACEMENT OF IMAGES IN AN IMAGE SEQUENCE

(75) Inventor: Andreas Engelsberg, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,982

(22) PCT Filed: Jan. 15, 2000

(86) PCT No.: PCT/DE00/00134

§ 371 (c)(1),
(2), (4) Date: Dec. 21, 2001

(87) PCT Pub. No.: WO00/54494

PCT Pub. Date: Sep. 14, 2000

(30) Foreign Application Priority Data

Mar. 5, 1999 (DE) ................................ 199 09 627

(51) Int. Cl.
*H04N 5/228* (2006.01)
*H04N 5/225* (2006.01)
(52) U.S. Cl. .................................... 348/208.3; 348/170
(58) Field of Classification Search ................ 348/170, 348/208.99, 208.1, 208.3, 208.4, 208.14, 348/240.2; 358/464, 540, 3.26; 382/289, 382/291, 293, 294, 295; 396/52, 54, 55
See application file for complete search history.

(56) References Cited

U.S. PATENT DOCUMENTS

| | | | | |
|---|---|---|---|---|
| 5,237,405 A | * | 8/1993 | Egusa et al. ............. | 348/208.1 |
| 5,497,191 A | * | 3/1996 | Yoo et al. ................ | 348/208.6 |
| 5,648,815 A | * | 7/1997 | Toba ....................... | 348/208.6 |

(Continued)

FOREIGN PATENT DOCUMENTS

EP  0 332 169  9/1989

(Continued)

OTHER PUBLICATIONS

Tucker et al.; "Image Stabilization for a Camera on a Moving Platform"; 1993; IEEE.*

(Continued)

*Primary Examiner*—John M. Villecco
(74) *Attorney, Agent, or Firm*—Kenyon & Kenyon LLP

(57) ABSTRACT

A device and a method for determining a displacement of images in an image sequence, which are specially used to compensate for a camera movement. A plurality of image regions of the images is available for determining the displacement, each image region being provided at a preselected position of the images, each image region having preselected dimensions, in particular, a predetermined number of pixels in various directions of the image, and an image movement mainly caused by a camera movement being separated from an additional movement that is superimposed on the image movement in a subregion of the image to be corrected, by calculating the probability of the movement occurring without the additional movement is calculated at different positions of an image, specifying and fixing for each image region, the position and the dimensions as a function of the probability of the image movement occurring inside the one image region without the additional movement, and preferentially using at least one image region out of the plurality of image regions for determining the displacement.

24 Claims, 2 Drawing Sheets

U.S. PATENT DOCUMENTS

| | | | | |
|---|---|---|---|---|
| 5,835,138 A | * | 11/1998 | Kondo | 348/208.4 |
| 5,870,208 A | * | 2/1999 | Fukuda et al. | 348/14.14 |
| 5,926,212 A | * | 7/1999 | Kondo | 348/208.4 |
| 5,949,481 A | * | 9/1999 | Sekine et al. | 348/208.8 |
| 6,628,711 B1 | * | 9/2003 | Mathew et al. | 348/208.4 |
| 6,735,250 B2 | * | 5/2004 | Inou | 348/699 |
| 6,809,758 B1 | * | 10/2004 | Jones | 348/208.99 |
| 7,130,464 B2 | * | 10/2006 | Kondo et al. | 382/291 |
| 7,154,541 B2 | * | 12/2006 | Kondo et al. | 348/208.1 |
| 2004/0001147 A1 | * | 1/2004 | Vella et al. | 348/208.99 |

FOREIGN PATENT DOCUMENTS

| | | | |
|---|---|---|---|
| EP | 0 496 635 | | 7/1992 |
| EP | 0 762 774 | | 3/1997 |
| GB | 2275842 A | * | 9/1994 |
| JP | 07107369 A | * | 4/1995 |
| JP | 10255058 A | * | 9/1998 |
| JP | 10336666 A | * | 12/1998 |

OTHER PUBLICATIONS

Jang S—I et al.: "A Real-Time Identification Method On Motion And Out-Of-Focus Blur For A Video Camera" *IEEE Transactions on Consumer Electronics*, US, IEEE Inc. New York, vol. 40, No. 2, May 1, 1994, pp. 145-152.

Kenya Umori et al.: "Automatic Image Stabilizing System by Full-Digital Signal Processing" *IEEE Transactions on Consumer Electronics*, US, IEEE Inc. New York, vol. 36, No. 3, Aug. 1, 1990, pp. 510-519.

H. Rindtorff: "Bildstabilisation in Consumer-Camcordern, Funktion und Wirkungsweise" ("Image Stabilization in Consumer Camcorders—Function and Mode of Operation") *Fernseh- und Kinotechnik* (*Television and Cinema Technology*), 49th year, No. ½, 1995.

* cited by examiner

METHOD AND DEVICE FOR DETERMINING A DISPLACEMENT OF IMAGES IN AN IMAGE SEQUENCE

FIELD OF THE INVENTION

The present invention relates to a device and method for determining the displacement of images in an image sequence.

BACKGROUND INFORMATION

An image-stabilization system, which is supposed to substantially stabilize an image while recording with a camcorder in one's hand, is discussed in the article of H. Rindtorff, "Bildstabilisation in Consumer-Camcordern, Funktion und Wirkungsweise" ("Image Stabilization in Consumer Camcorders—Function and Mode of Operation") Fernseh—und Kinotechnik (Television and Cinema Technology), 49th year, no. ½, 1995.

In this context, and as characterized, the image is split up into four sectors, in which movement vectors describing the displacement of the image are determined. A total movement vector, which ideally represents the displacement of the camera, is determined from the movement vectors of the individual sectors.

SUMMARY OF THE INVENTION

In contrast, it is believed that the exemplary method of the present invention has the advantage that image regions, which are specially used in the sections of an image to determine the displacement of the images, are distinguished by as high probability as possible, of the image movement occurring without the additional movement. In this way, it is believed that the displacement of images of an image sequence may be determined in a particularly reliable manner. In addition, it is believed that this is conducive to reliably determining the displacement of images in an image sequence, when the position and the dimensions of the image regions are fixed.

It is believed that this may especially allow the displacement to be reliably determined for a special scenario of moving picture communication (full-motion video), using relatively little processing time. A first image region, which may be preferentially used from the plurality of image regions to determine the displacement, may be used alone for determining the displacement, by selecting its position and its dimensions inside the images, so that other image regions do not have to be considered, and thus, the processing time for determining the displacement of images is decreased.

It is believed that it may be advantageous that a first image of the image sequence is corrected by determining the displacement, either from image data of the first image and image data of a second image of the image sequence that may precede the first image directly, or from image data of the first image and image data of a second input image of the image sequence that may precede the first image directly. A regional displacement of an image region being used as a displacement, and the regional displacement of an image region of the plurality of the image regions either being determined from the image data of the first image and the second image inside the one image region, or from the image data of the first image and the second input image inside the one image region. In this manner, only the image data of the first and the second images inside the image region, which is used for determining the displacement of the image, are needed for processing, which means that the processing time may be reduced.

In addition, it is believed that it may be advantageous that the position and the dimensions of the at least one first image region are selected so that the at least one first image region of the images to be corrected is mainly filled in by the image background. Since the image background may rarely exhibit additional movements from one image to another image, between which the displacement should be determined, in which case the additional movements are superimposed on the image movement that is especially caused by the unintentional movement of a camera, a first image region of the images to be corrected may be advantageously used for determining the displacement, when it is filled in by the image background.

Furthermore, it is believed that it may be advantageous that the position and the dimensions of at least one second image region are selected in such a manner, that the at least one second image region of the images to be corrected is mainly filled in by the image foreground. This may allow the displacement of images of an image sequence to be determined in an especially simple manner, and with high accuracy, when, for example, the image background is subjected to a sharp, additional movement, which is superimposed on the image movement that may be caused by the unintentional camera movement.

To determine the displacement, it is also believed to be advantageous to use at least one first image region and/or at least one second image region as a function of a margin of reliability (reliability factor), for determining the regional displacement. This allows the determination of the region displacement to be checked, because a measure for the reliability of the regional-displacement determination is available inside the exemplary method. Therefore, the determination of a reliability factor for the regional-displacement determination is primarily used to simply and reliably separate the image movement from the additional movement superimposed on it.

Furthermore, it is believed that it may be advantageous that two first image regions and an individual second image region are available for image correction, the displacement being determined in one of the following three ways, in the order of descending priority:

from the mean of the regional displacements of the two first image regions, when the reliability factor of the regional-displacement determination of the two first image sequences is considered to be sufficient;

from the regional displacement of one of the two first image regions, in which the reliability of the regional-displacement determination is considered to be sufficient;

from the regional displacement of the second image region.

It is believed that this may allow different image regions of different priority to be used for determining the displacement of images in an image sequence. In particular, image regions, which are mainly filled in by the image background, may be preferentially used for determining the displacement of images. The use of the mean of the regional displacements of the two first image regions resulting in a reliable determination of the displacement.

The second priority for determining the displacement, using the regional displacement calculated from the two first image regions, is especially selected to minimize the influence of objects moving in the background, since an object moving into one of the two first image regions leads to the regional displacement of the other of the two image regions being used for determining the displacement of images in an image sequence.

On the third level of priority, the displacement of images from the regional displacement of the second image region, especially from the regional displacement of an image region that is mainly filled in by the image foreground, is used.

In addition, it is believed that it may be advantageous that the exemplary method is used for a head-shoulder recording situation, the two first image regions being selected to be in a lateral image region, to the left and right of, and which may be symmetrical to, the vertical center line of a predetermined rectangular image, the distance of the two first image regions from the bottom image margin being selected to be greater than the distance of the two first image regions from the top image margin, the second image region being selected to be near the center of the image, which may be symmetric to the vertical center line of the rectangular image, and the distance of the second image region from the top image margin may be selected to be greater than the distance of the second image region from the bottom image margin.

In the case of a head-shoulder recording situation, such a choice of image regions particularly allows the information from the image regions to be sensibly used for determining the regional displacements, and sensibly used to determine the displacement of images in an image sequence, by prioritizing the use of regional displacements.

In addition, it is believed that it may be advantageous that, for two image regions, which may be the two first image regions, the regional displacement and the reliability of the regional-displacement determination are determined by an exemplary method having the following steps:
  the regional displacement and a correlation quotient are calculated for each of the two image regions;
  a threshold value function is determined as a function of each ascertained regional displacement of the two image regions;
  each correlation quotient of one of the two image regions is compared to the value, which results from a threshold value function for the regional displacement of the other of the two image regions;
  the reliability of the regional-displacement determination for each of the two image regions is viewed as being sufficient, when the correlation quotient corresponding to the one image region is greater than the value of the threshold-value function to be compared to the correlation quotient.

In this manner, the reliability factors for the regional displacement of the two first image regions are not determined independently of each other, but rather the ascertained regional displacement of one of the two first image regions determines the value, which the threshold-value function assumes, and to which the regional displacement of the other of the two first image regions is compared. Therefore, the regional displacement of one image region and the reliability factor of the regional displacement are not determined independently of movements, especially regional displacements, in other parts of an image.

Furthermore, it is believed that it may be advantageous that the correlation quotient of one of the two image regions is determined according to an exemplary method having the following steps:
  using a block-matching method, displacement-correlation values are determined for several possible regional displacements;
  the regional displacement, for which the displacement-correlation values are maximized, is regarded as the regional displacement of the image region;
  the correlation quotient is formed by dividing the maximum displacement-correlation value by the average value of the calculated displacement-correlation values.

In this manner, the regional displacement is first of all determined using the entire image region, since the displacement-correlation values are calculated by forming the sum over (of) all the image points of the image region in consideration. Secondly, the correlation quotient is normalized, since the maximum displacement-correlation value, from which the regional displacement results, is divided by the mean of the calculated displacement-correlation values.

In addition, it is believed that it may be advantageous that, for each arbitrary regional displacement less than a preselected first threshold value, the value of a preselected second threshold value is assumed by the threshold-value function, and that, for each arbitrary regional displacement greater than the preselected first threshold value, the value of the preselected second threshold value minus a product is assumed by the threshold-value function. The product including a preselected slope parameter and a difference as factors, and the difference being formed from the arbitrary regional displacement and the preselected first threshold value.

It is believed that an advantage of this may be that, for larger, ascertained regional displacements of an image region, the regional displacement is allowed a sufficient margin of reliability, even when the correlation coefficient is smaller, which, in the case of a small, ascertained regional displacement, would indicate a correlation that is not as good. Due to the dependence of the two first image regions in the calculation of the reliability factor for the determination of the regional displacement, the result of the structure of the threshold-value function is that, in response to a relatively large regional displacement of one of the two first image regions, the required reliability of the regional-displacement determination, that is, the required magnitude of the correlation coefficient, may not be as high.

In another exemplary method for determining a displacement of images in an image sequence, block-displacement information from a block-based encoding method is used for determining the regional displacement. The block-displacement information, which may be displacement vectors, of blocks lying inside the specific image region being considered for each of the image regions. It is believed that this should result in an especially simple and cost-effective implementation of the exemplary method according to the present invention, especially when, for example, block-displacement information, in particular block-displacement vectors, of small image blocks can be obtained without additional expenditure, or with only a small amount of additional expenditure.

In addition, an exemplary method according to the present invention implements the following steps for each of the image regions, to determine the regional displacement that has a horizontal and vertical component, and to calculate the reliability factor of the regional-displacement determination.
  To calculate the horizontal component of the regional displacement, a first frequency distribution is generated for the frequencies of different values of the horizontal components of the block-displacement information, the horizontal component of the regional displacement corresponding to the value of the horizontal component of the block-displacement information, at which the first frequency distribution assumes its principal (global, absolute) maximum;

to calculate the vertical component of the regional displacement, a second frequency distribution is generated for the frequencies of different values of the vertical components of the block-displacement information, the vertical component of the regional displacement corresponding to the value of the vertical component of the block-displacement information, at which the second frequency distribution assumes its principal maximum;

the reliability of the regional-displacement determination is considered to be sufficient, when all of the following conditions are fulfilled:

the absolute value of the difference in the position of the values of the horizontal component of the block-displacement information, which correspond to the principal maximum and the secondary (local, relative) maximum of the first frequency distribution, is less than a preselected, first difference threshold;

the absolute value of the difference in the position of the values of the vertical component of the block-displacement information, which correspond to the principal maximum and the secondary maximum of the second frequency distribution, is less than a preselected, second difference threshold;

the principal maximum of the first frequency distribution is greater than a first frequency threshold; and the principal maximum of the second frequency distribution is greater than a second frequency threshold.

By considering the frequencies of the occurring, horizontal and vertical components of the already present block-displacement information, firstly, the regional displacement of an image region may be determined, and secondly, the reliability factor of the regional-displacement determination may be calculated.

The exemplary device of the present invention, which is for determining a displacement of images in an image sequence, is believed to have the advantage that the displacement can especially be determined in a quicker and simpler manner by implementing the exemplary method steps of the exemplary method according to the present invention, in a microchip or on a printed circuit board, which should result in the exemplary method of the present invention being carried out in a quicker and more cost-effective manner.

DETAILED DESCRIPTION

Figure 1:
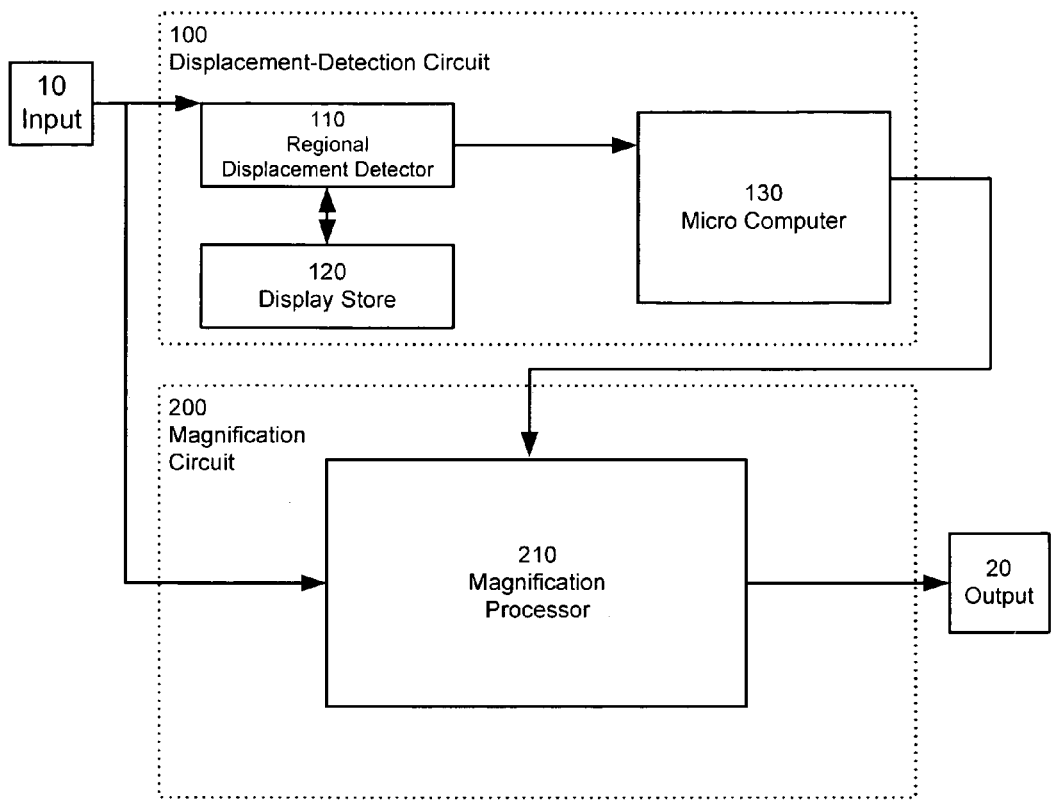
FIG. 1 shows a block diagram of the exemplary device according to the present invention.

FIG. 1 shows a block diagram of the exemplary device according to the present invention, for determining a displacement of images in an image sequence. The exemplary device includes an input 10, an output 20, a displacement-detection circuit 100, and a magnification circuit 200. Displacement-detection circuit 100 includes a regional-displacement detector 110, an image-storage device (display store) 120, and a microcomputer 130. In addition, displacement-detection circuit 100 includes an input, which is not shown and is connected to input 10 of the exemplary device according to the present invention, to regional-displacement detector 110, and to image-storage device 120.

In addition, displacement-detection circuit 100 includes an output, which is not shown and is connected to microcomputer 130. Regional-displacement detector 110 is also connected to microcomputer 130. Magnification circuit 200 includes two inputs not shown and an output, which is connected to output 20 of the exemplary device. The two inputs of magnification circuit 200 are each connected to a magnification processor 210, one of the two inputs of magnification circuit 200 being connected to input 10 of the exemplary device, and the other of the two inputs of magnification circuit 200 being connected to the output of displacement-detection circuit 100.

Figure 2:
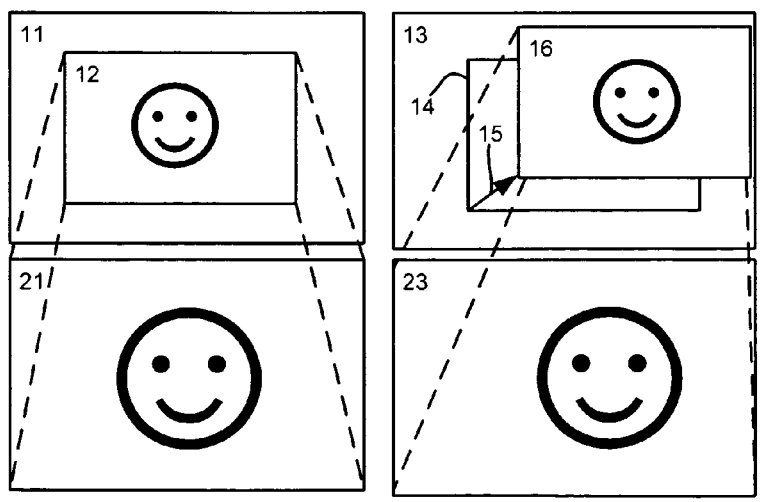
FIG. 2 shows the principal of image stabilization, by determining a displacement of images in an image sequence.

FIG. 2 shows an example of image stabilization, for example, compensating for camera movements. In this context, a first input image 13 is corrected to form a first output image 23, use being made of image information regarding a second input image 11, which may precede the first input image in time.

Second input image 11 includes an image detail, which is enlarged by magnification to form second output image 21. In this context, second input image 11 is completely recorded by the camera, but a user of the exemplary device may only see the image detail in magnified form, as second output image 21. In this case, the image detail is referred to as second image 12, or also as corrected second image 12.

According to another exemplary method of the present invention, corrected second image 12 is used to correct first input image 13. First input image 13 also includes an image detail, which is referred to here as uncorrected first image 14. A displacement 15 can be determined by comparing uncorrected first image 14 to second image 12, that is, to corrected second image 12, so that uncorrected first image 14 can be converted into a corrected first image 16, using displacement 15. In particular, not all of the image data are utilized in comparing uncorrected first image 14 to second image 12, but rather, just the image data from image regions (not shown) of first image 14 and second image 12.

According to another exemplary method of the present invention, second image 11 is used to correct first input image 13. Displacement 15 can be determined by comparing first input image 13 to second input image 11, so that uncorrected first image 14 can be converted into corrected first image 16, using displacement 15. In particular, not all of the image data are utilized in comparing first input image 13 to second input image 11, but rather, just the image data from image regions (not shown) of first input image 13 and second input image 11.

Corrected first image 16 can now be shown to the user as a first output image 23, in accordance with both the first and second exemplary methods. Compared to the second output image, the displacement of first input image 13 or corrected first image 16 can no longer be observed in first output image 23.

Figure 3:
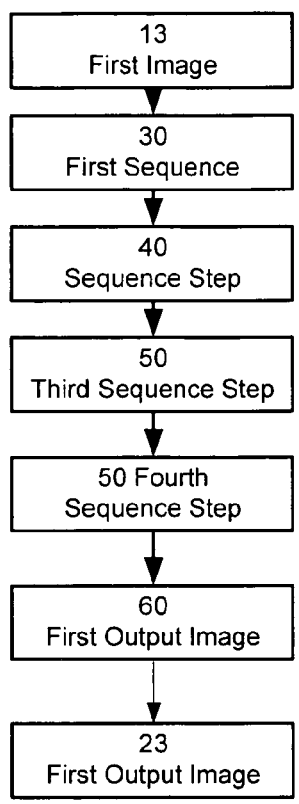
FIG. 3 shows a flowchart for image stabilization.

The method steps of the exemplary method according to the present invention are shown in FIG. 3 by a flow chart, using the correction of first input image 13 as an example. The regional displacements of image regions are determined in a first sequence step 30. In this connection, first input image 13 is compared to corrected second image 12, which especially precedes it in time, or the first input image is compared to second input image 11, which especially precedes it in time. In sequence step 40, the displacement of first image 14 is subsequently determined in accordance with the exemplary method. In third sequence step 50, uncorrected first image 14 is displaced by displacement vector 15. The result of this operation is corrected first image 16. Subsequently, corrected first image 16 is enlarged in fourth sequence step 60, which results in first output image 23.

To correct a further input image, the result of third sequence step 50 can be made available to first sequence step 30 by storing it, which may be in image-storage device 120. The result of third sequence step 50 is corrected first image 16, which therefore appears in the place of corrected second image 12, and, in connection with the correction of the further input image, is used for determining regional displacements in first sequence step 30.

As an alternative, first input image 13 or uncorrected first image 14 can, together with calculated displacement 15, also be saved in image-storage device 120, to correct an additional input image.

Figure 4:
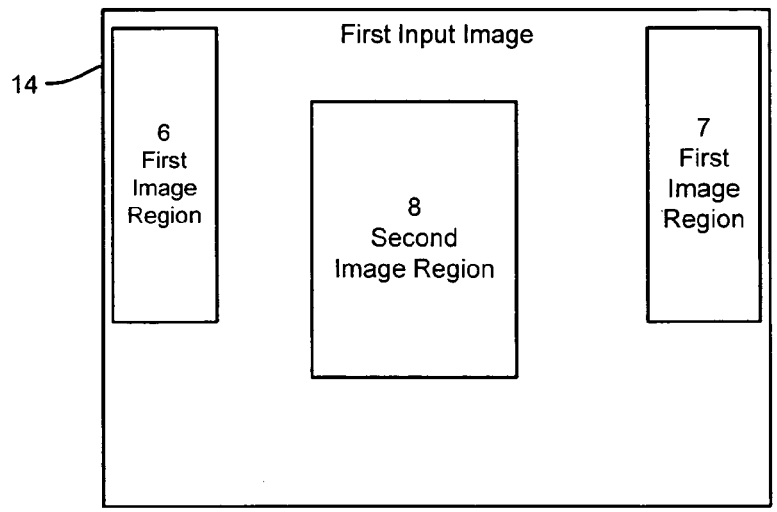
FIG. 4 shows an example of selecting image regions inside an image, to implement the exemplary method according to the present invention.

FIG. 4 shows an example of a distribution of image details 6, 7, 8 inside first input image 14. In this context, two first image regions 6, 7 are selected to be symmetric to the vertical center line of given, rectangular first image 14, especially for using the exemplary method of the present invention in a head-shoulder recording situation. In this context, the distance of the two first image regions 6, 7 from the bottom image margin is greater than the distance of the two first image regions 6, 7 from the top image margin. A second image region 8 is selected to be near the center of first image 14, which may be symmetric to the vertical center line of the rectangular image, the distance of second image region 8 from the top image margin which may be selected to be greater than the distance of the second image region from the bottom image margin.

The exemplary method of the present invention for determining a displacement 15 of images in an image sequence may be used for image stabilization, to compensate for camera movements in consumer video cameras (camcorders). The digital, full-motion image stabilization of the exemplary method renders it particularly suitable for mobile moving-picture communication (mobile full-motion video) devices. Movements caused by the mobile use of a full-motion video device should be reduced or eliminated to the greatest possible extent.

One aspect of the exemplary method is to derive (deduce) the camera movement from the relative displacement of consecutive images, and to extract the subregion, for example, corrected first image 16, from an input image, for example, first input image 13, the subregion compensating for the camera movement, based on the ascertained displacement 15, in particular of corrected first image 16, with respect to uncorrected first image 14.

In the exemplary method, a plurality of image regions 6, 7, 8 are made available for determining displacement 15. The image regions can be clearly (uniquely) determined inside the image, using their positions and their dimensions. By advantageously selecting the position and the dimensions of image regions 6, 7, 8, an image movement that is mainly generated by a camera movement can now be separated in a particularly simple manner, from an additional movement, which is superimposed on the image movement in subregions of the image to be corrected.

In addition, the probability of the image movement occurring at various positions of the images of an image sequence without the additional movement, is determined. The result of this is preferential portions (sections) inside the image, which can be used for separating the image movement from the additional movement. For example, the selection of image regions 6, 7, 8 represented in FIG. 4 is especially advantageous for the special recording situation of a speaker who is in the center of the image.

The special characteristics of the recording situation are used as a priori knowledge in selecting and fixing image regions 6, 7, 8. In this recording situation, it can be assumed that the two first image regions 6, 7 are essentially in the background of the image and second image region 8 is essentially in the foreground.

This means that the two first image regions 6, 7 are mainly filled up with image data from the image background, and that second image region 8 is mainly filled up with image data from the image foreground. This allows the two first image regions 6, 7 to be advantageously prioritized, so that the determination of a displacement 15 of images in an image sequence may be derived from the determination of the regional displacement of the two first image regions 6, 7. Second image region 8 is only used for determining displacement 15 of images, when the use of regional displacements from the two first image regions 6, 7 merely permits a regional displacement, which is encumbered by a large lack of reliability or an insufficiently large reliability factor.

In the specified example, this prioritization is synonymous to the image stabilization being carried out or performed using image-background information. However, this method does not exclusively relate to the differentiation and variable prioritization of background and foreground information, to determine a displacement of images in an image sequence, but also relates, for example, to the use of criteria such as edge detection, absence of edge detection, or similar.

In the specified example in QCIF format (Quarter Common Intermediate Format), the two first image regions 6, 7 typically extend 120 pixels in the vertical direction and 40 pixels in the horizontal direction. In this image format, second image region 8 typically extends over 135 pixels in the vertical direction and 85 pixels in the horizontal direction.

In the exemplary method for determining a displacement 15 of images in an image sequence, in particular, for image stabilization using a plurality of image regions 6, 7, 8 that each essentially cover the foreground or the background, the most favorable combination of information may be ascertained in each case from the subregions, to minimize the influence of moving objects in the background. With the aid of a decision criterion, a moving object is detected in the image regions, which are, for the most part, covered by the background.

If the two second image regions 6, 7 do not contain a moving object, and therefore, do not contain an additional movement by the moving object, which is superimposed on the image movement and is especially caused by a camera movement, then the displacement to be calculated is determined from the mean of the calculated regional displacements of the two first image regions 6, 7. If one first image region 6, 7 contains a moving object, then displacement 15 to be determined is ascertained from the other image region not having a moving object. If both first image regions 6, 7 contain a moving object, then the information from second image region 8, the foreground subregion, is used for determining the movement.

To determine the regional displacement of an image region 6, 7, 8, two alternative methods may be used, depending on whether or not block-displacement information from a block-based encoding method, for example, from a block-based transmission mode (method) for reducing bandwidth, is accessible in a relatively simple way.

If block-displacement information is not easily accessible (readily available), then a block-matching method, by which an additional movement, that is, a local movement inside one of the two first image regions 6, 7, can be detected, is used for determining the regional displacement. A local movement, for example, an appearing object, occurring in an image region 6, 7, 8 can be detected by evaluating the displacement-correlation values from the block-matching method.

To this end, the ratio of the average value of the displacement-correlation values to the maximum correlation value is compared to an adaptive threshold-value function. To determine the mean of the displacement-correlation values, the sum of all of the determined correlation values is calculated and subsequently divided by the number of correlation values. The maximum displacement-correlation value is assumed for a particular displacement. The regional displacement corresponding to the maximum displacement-correlation value is assumed to be the regional displacement. The correlation quotient corresponds to the maximum displacement-correlation value divided by the mean of the displacement-correlation values, and is therefore normalized.

An additional movement, that is, a local movement inside the image region, is then detected when the correlation quotient is less than the value of an adaptive threshold-value function. The adapted threshold-value function is a function of the length of a displacement vector, which indicates a regional displacement. To detect an additional movement or a local movement in one of the two first image regions 6, 7, the correlation quotient of the first region 6, 7 in consideration may be compared to the value of the adaptive threshold-value function, the value of the adaptive threshold-value function resulting from the vector length of displacement 15 for the other of the two first image regions 6, 7. In this context, the threshold-value function may be defined as follows:

for any arbitrary length of the regional-displacement vector, that is, for any arbitrary displacement, which is less than a preselected, first threshold value, the value of a preselected, second threshold value is assumed by the threshold-value function;

for any arbitrary length of the regional-displacement vector, which is greater than the preselected, first threshold value, the value of the preselected, second threshold value minus a product is assumed by the threshold value function, the product including a preselected slope parameter and a difference as factors, and the difference being formed from the arbitrary regional displacement and the preselected first threshold value.

The second exemplary method for determining the displacement of images in an image sequence is based on the use of block-displacement information from a block-based encoding method. As an alternative to calculating displacement, using a block-matching method for an image region 6, 7, 8, the displacement vectors of small blocks, for example, of size 8×8 or 16×16 can also be used for determining the regional displacement of image regions 6, 7, 8, and therefore, information from an encoding method can be directly used to reduce the computational time.

This approach may be particularly of interest if, for example, hardware support allows the block-displacement vectors to be obtained without additional expenditure, or with only a small amount of additional expenditure. A local movement inside an image region 6, 7, 8, in particular, inside one of the two first image regions 6, 7, can be detected in an especially simple manner, when displacement vectors of small blocks of the image are, for example, known from an encoding method.

In this context, all of the displacement vectors for blocks lying within one of image regions 6, 7, 8 are initially assigned to the corresponding image region 6, 7, 8. Separate frequency distributions or histograms are generated for the horizontal and vertical components of each of the assigned displacement vectors. The result for each image region 6, 7, 8 is a first frequency distribution for the horizontal component and a second frequency distribution for the vertical component of the displacement vectors of the image blocks.

An additional movement or a local movement is detected by analyzing the frequency distributions assigned to the one image region. A local movement is detected, if the difference of the positions between the principal maximum and the greatest secondary maximum of one of the two assigned frequency distributions exceeds a certain threshold value, and the magnitude of the principal maxima falls below a threshold value.

The determination of a local or additional movement inside an image region means that the regional displacement could not be calculated with sufficient reliability. Consequently, the calculation of the reliability factor of the regional-displacement determination yields a negative result with regard to the regional-displacement determination.

The exemplary method for determining the regional displacement, including its horizontal and vertical components, and for calculating the reliability of the regional-displacement determination, is described as follows:

to calculate the horizontal component of the regional displacement, a first frequency distribution is generated for the frequencies of different values of the horizontal components of the block-displacement information, the horizontal component of the regional displacement corresponding to the value of the horizontal component of the block-displacement information, at which the first frequency distribution assumes its principal maximum;

to calculate the vertical component of the regional displacement, a second frequency distribution is generated for the frequencies of different values of the vertical components of the block-displacement information, the vertical component of the regional displacement corresponding to the value of the vertical component of the block-displacement information, at which the second frequency distribution assumes its principal maximum;

the reliability of the regional-displacement determination is considered to be sufficient, when all of the following conditions are fulfilled:

the absolute value of the difference in the position of the values of the horizontal component of the block-displacement information, which correspond to the principal maximum and the secondary maximum of the first frequency distribution, is less than a preselected, first difference threshold;

the absolute value of the difference in the position of the values of the vertical component of the block-displacement information, which correspond to the principal maximum and the secondary maximum of the second frequency distribution, is less than a preselected, second difference threshold;

the principal maximum of the first frequency distribution is greater than a first frequency threshold; and the principal maximum of the second frequency distribution is greater than a second frequency threshold;

As an alternative to the block-matching method for an image region 6, 7, 8 in question, block-displacement vectors of a block-oriented image encoding method can therefore be used to determine the displacement of images in an image sequence, to reduce the computational time. For the block-matching method, a criterion was specified which is suited for detecting local movements inside relevant image region 6, 7, 8, and is synonymous to the reliability of the regional-displacement determination not being sufficient. A criterion for detecting local movements inside relevant image regions 6, 7, 8 was likewise specified for the displacement-estimation method using block-displacement vectors.

What is claimed is:

1. A method for determining a displacement of images in an image sequence for compensating for a camera movement, a plurality of image regions of the images being available for determining the displacement, each of the plurality of image regions being provided at a preselected position of the images, and each of the plurality of image regions having preselected dimensions, in which there are predetermined numbers of pixels in various directions of the image, and for separating an image movement mainly caused by a camera movement from an additional movement, which is superimposed on the image movement in subregions of an image to be corrected, the method comprising:

determining a probability of the image movement occurring without the additional movement at different positions of an image;

specifying and fixing, for each of the plurality of image regions, a position and dimensions as a function of the probability of the image movement occurring inside at least one image region of the plurality of image regions without the additional movement; and determining the displacement by preferentially using the at least one image region of the plurality of image regions.

2. The method of claim 1, wherein:

the method includes:

correcting a first image of the image sequence by determining the displacement from one of (i) first image data of the first image of the image sequence and second image data of a second image of the image, and (ii) the first image data of the first image of the image sequence and starting image data of a starting image sequence; and determining a regional displacement of the at least one image region of the plurality of the image regions is determined from one of (i) the first image data of the first image and the second image inside the at least one image region, and (ii) the first image data of the first image and the second starting image inside the at least one image region; and the step of determining the displacement uses the regional displacement of the at least one image region of the plurality of image regions as the displacement.

3. The method of claim 2, wherein:

two first image regions and one second image region are available for image correction; and the displacement is determined from one of the following, in a descending priority order:

a mean of regional displacements of the two first image regions, when a reliability of the regional displacement determinations for the two first image regions is considered sufficient;

a regional displacement of one of the two first image regions, when a reliability of the regional displacement determination is considered sufficient; and a regional displacement of the second image region.

4. The method of claim 2, wherein at least one of at least one first image region and at least one second image region is used as a function of a reliability factor for determining the regional displacement to determine the displacement.

5. The method of claim 4, wherein for each of the image regions, the regional displacement is determined using block-displacement information from a block-based encoding process by considering the block-displacement information of blocks lying inside a specific image region.

6. The method of claim 5, wherein the block-displacement information includes displacement vectors.

7. The method of claim 2, wherein the second image data of the second image of the image sequence precedes directly the first image.

8. The method of claim 2, wherein the starting image data of the starting image of the image sequence precedes directly the first image.

9. The method of claim 1, wherein the position and the dimensions of at least one first image region are selected so that the at least one first image region of images to be corrected is mainly filled in by an image background.

10. The method of claim 1, wherein the position and the dimensions of at least one second image region are selected so that the at least one second image region of images to be corrected is mainly filled in by an image foreground.

11. A method for determining a displacement of images in an image sequence for compensating for a camera movement, a plurality of image regions of the images being available for determining the displacement, each of the plurality of image regions being provided at a preselected position of the images, and each of the plurality of image regions having preselected dimensions, in which there are predetermined numbers of pixels in various directions of the image, and for separating an image movement mainly caused by a camera movement from an additional movement, which is superimposed on the image movement in subregions of an image to be corrected, wherein the method is used for a head-shoulder recording situation, the method comprising:

determining a probability of the image movement occurring without the additional movement at different positions of an image;

specifying and fixing, for each of the plurality of image regions, a position and dimensions as a function of the probability of the image movement occurring inside at least one image region of the plurality of image regions without the additional movement;

determining the displacement by preferentially using the at least one image region of the plurality of image regions;

correcting a first image of the image sequence by determining the displacement from one of (i) first image data of the first image of the image sequence and second image data of a second image of the image, and (ii) the first image data of the first image of the image sequence and starting image data of a starting image sequence;

determining a regional displacement of the at least one image region of the plurality of the image regions is determined from one of (i) the first image data of the first image and the second image inside the at least one image region, and (ii) the first image data of the first image and the second starting image inside the at least one image region, wherein the step of determining the displacement uses the regional displacement of the at least one image region of the plurality of image regions as the displacement;

selecting the two first image regions to be in a lateral region to the left and right of a vertical center line of a predetermined rectangular image;

selecting a distance of the two first image regions from a bottom image margin to be greater than another distance of the two first image regions from a top image margin; and selecting the second image region to be near a center of the image;

wherein:

two first image regions and one second image region are available for image correction; and the displacement is determined from one of the following, in a descending priority order:
   a mean of regional displacements of the two first image regions, when a reliability of the regional displacement determinations for the two first image regions is considered sufficient;
   a regional displacement of one of the two first image regions, when a reliability of the regional displacement determination is considered sufficient; and
   a regional displacement of the second image region.

12. The method of claim 11, wherein the two first image regions are selected to be in the lateral region to the left and right of the vertical center line of the predetermined rectangular image, and symmetrical to the vertical center line.

13. The method of claim 12, wherein the second image region is selected to be near the center of the image, and symmetric to the vertical center line of the rectangular image.

14. The method of claim 13, wherein the distance of the second image region from the top image margin is selected to be greater than the distance of the second image region from the bottom image margin.

15. The method of claim 11, wherein the second image region is selected to be near the center of the image, and symmetric to the vertical center line of the rectangular image.

16. The method of claim 11, wherein the distance of the second image region from the top image margin is selected to be greater than the distance of the second image region from the bottom image margin.

17. A method for determining a displacement of images in an image sequence for compensating for a camera movement, a plurality of image regions of the images being available for determining the displacement, each of the plurality of image regions being provided at a preselected position of the images, and each of the plurality of image regions having preselected dimensions, in which there are predetermined numbers of pixels in various directions of the image, and for separating an image movement mainly caused by a camera movement from an additional movement, which is superimposed on the image movement in subregions of an image to be corrected, the method comprising:

determining a probability of the image movement occurring without the additional movement at different positions of an image;

specifying and fixing, for each of the plurality of image regions, a position and dimensions as a function of the probability of the image movement occurring inside at least one image region of the plurality of image regions without the additional movement;

determining the displacement by preferentially using the at least one image region of the plurality of image regions;

correcting a first image of the image sequence by determining the displacement from one of (i) first image data of the first image of the image sequence and second image data of a second image of the image, and (ii) the first image data of the first image of the image sequence and starting image data of a starting image sequence; and determining a regional displacement of the at least one image region of the plurality of the image regions is determined from one of (i) the first image data of the first image and the second image inside the at least one image region, and (ii) the first image data of the first image and the second starting image inside the at least one image region;

wherein the determining of the displacement uses the regional displacement of the at least one image region of the plurality of image regions as the displacement;

wherein at least one of at least one first image region and at least one second image region is used as a function of a reliability factor for determining the regional displacement to determine the displacement; and wherein determined regional displacements and reliability factors of the determined regional displacements for two image regions are determined by:
   determining a regional displacement and a correlation quotient for each of the two image regions;
   determining a threshold value function as a function of the regional displacement of each of the two image regions;
   comparing a determined correlation quotient of one of the two image regions to a threshold value resulting from the threshold value function for a regional displacement of another of the two image regions; and
   determining the reliability factor of the determined regional displacement of each of the two image regions to be sufficient when the determined correlation quotient corresponding to the one of the two image regions is greater than the threshold value of the threshold value function compared to the determined correlation quotient.

18. The method of claim 17, wherein the determined correlation quotient of one of the two image regions is determined by:

using block-matching to determine displacement correlation values for a plurality of possible regional displacements;

determining a regional displacement having a maximum displacement correlation value to be the regional displacement of the image regions; and determining the correlation quotient by dividing the maximum displacement correlation value by a mean of determined displacement correlation values.

19. The method of claim 17, wherein:

the threshold value function assumes a value of a preselected second threshold value by for each arbitrary regional displacement less than a preselected first threshold value;

the threshold value function assumes a value of the preselected second threshold value minus a product for each arbitrary regional displacement greater than the preselected first threshold value;

the product includes a preselected slope parameter and a difference as factors; and the difference being formed from the arbitrary regional displacement and the preselected first threshold value.

20. The method of claim 17, wherein the two image regions include the two first image regions.

21. A method for determining a displacement of images in an image sequence for compensating for a camera movement, a plurality of image regions of the images being available for determining the displacement, each of the plurality of image regions being provided at a preselected position of the images, and each of the plurality of image regions having preselected dimensions, in which there are predetermined numbers of pixels in various directions of the image, and for separating an image movement mainly caused by a camera movement from an additional movement, which is superimposed on the image movement in subregions of an image to be corrected, the method comprising:

determining a probability of the image movement occurring without the additional movement at different positions of an image;

specifying and fixing, for each of the plurality of image regions, a position and dimensions as a function of the probability of the image movement occurring inside at least one image region of the plurality of image regions without the additional movement;

determining the displacement by preferentially using the at least one image region of the plurality of image regions;

correcting a first image of the image sequence by determining the displacement from one of (i) first image data of the first image of the image sequence and second image data of a second image of the image, and (ii) the first image data of the first image of the image sequence and starting image data of a starting image sequence; and determining a regional displacement of the at least one image region of the plurality of the image regions is determined from one of (i) the first image data of the first image and the second image inside the at least one image region, and (ii) the first image data of the first image and the second starting image inside the at least one image region, wherein the determining of the displacement uses the regional displacement of the at least one image region of the plurality of image regions as the displacement;

wherein at least one of at least one first image region and at least one second image region is used as a function of a reliability factor for determining the regional displacement to determine the displacement;

wherein for each of the image regions, the regional displacement is determined using block-displacement information from a block-based encoding process by considering the block-displacement information of blocks lying inside a specific image region; and wherein for each of the image regions, the regional displacement, including a horizontal component and a vertical component, and the reliability factor of a determined regional displacement are determined by:

determining the horizontal component of the regional displacement by generating a first frequency distribution for frequencies of different values of the horizontal component of the block-displacement information, the horizontal component of the regional displacement corresponding to a value of the horizontal component of the block-displacement information, at which the first frequency distribution assumes its principal maximum;

determining the vertical component of the regional displacement by generating a second frequency distribution for frequencies of different values of the vertical component of the block-displacement information, the vertical component of the regional displacement corresponding to a value of the vertical component of the block-displacement information, at which the second frequency distribution assumes its principal maximum;

determining the reliability factor of the determined regional displacement to be sufficient when all of the following conditions are satisfied:

an absolute value of a difference in position of values of the horizontal component of the block-displacement information, corresponding to the principal maximum and a secondary maximum of the first frequency distribution, is less than a preselected first difference threshold;

the absolute value of a difference in position of values of the vertical component of the block-displacement information, corresponding to the principal maximum and a secondary maximum of the second frequency distribution, is less than a preselected second difference threshold;

the principal maximum of the first frequency distribution is greater than a first frequency threshold; and the principal maximum of the second frequency distribution is greater than a second frequency threshold.

22. A device for determining a displacement of images in an image sequence, the device comprising:

a displacement-detection arrangement to perform a process for determining the displacement of images in the image sequence for compensating for a camera movement, a plurality of image regions of the images being available for determining the displacement, each of the plurality of image regions being provided at a preselected position of the images, and each of the plurality of image regions having preselected dimensions, in which there are predetermined numbers of pixels in various directions of the image, and for separating an image movement mainly caused by a camera movement from an additional movement, which is superimposed on the image movement in subregions of an image to be corrected, the process including:

determining a probability of the image movement occurring without the additional movement at different positions of an image;

specifying and fixing, for each of the plurality of image regions, a position and dimensions as a function of the probability of the image movement occurring inside at least one image region of the plurality of image regions without the additional movement; and determining the displacement by preferentially using the at least one image region of the plurality of image regions.

23. A method for determining a displacement of images in an image sequence for compensating for a camera movement, a plurality of image regions of the images being available for determining the displacement, each of the plurality of image regions being provided at a preselected position of the images, and each of the plurality of image regions having preselected dimensions, in which there are predetermined numbers of pixels in various directions of the image, and for separating an image movement mainly caused by a camera movement from an additional movement, which is superimposed on the image movement in subregions of an image to be corrected, wherein the method is used for a head-shoulder recording situation, the method comprising:

determining a probability of the image movement occurring without the additional movement at different positions of an image;

specifying and fixing, for each of the plurality of image regions, a position and dimensions as a function of the probability of the image movement occurring inside at least one image region of the plurality of image regions without the additional movement;

determining the displacement by preferentially using the at least one image region of the plurality of image regions;

selecting the two first image regions to be in a lateral region to the left and right of a vertical center line of a predetermined rectangular image;

selecting a distance of the two first image regions from a bottom image margin to be greater than another distance of the two first image regions from a top image margin; and selecting the second image region to be near a center of the image;

wherein:

two first image regions and one second image region are available for image correction; and the displacement is determined from one of the following, in a descending priority order:

a mean of regional displacements of the two first image regions, when a reliability of the regional displacement determinations for the two first image regions is considered sufficient;

a regional displacement of one of the two first image regions, when a reliability of the regional displacement determination is considered sufficient; and a regional displacement of the second image region.

24. A method for determining a displacement of images in an image sequence for compensating for a camera movement, a plurality of image regions of the images being available for determining the displacement, each of the plurality of image regions being provided at a preselected position of the images, and each of the plurality of image regions having preselected dimensions, in which there are predetermined numbers of pixels in various directions of the image, and for separating an image movement mainly caused by a camera movement from an additional movement, which is superimposed on the image movement in subregions of an image to be corrected, the method comprising:

determining a probability of the image movement occurring without the additional movement at different positions of an image;

specifying and fixing, for each of the plurality of image regions, a position and dimensions as a function of the probability of the image movement occurring inside at least one image region of the plurality of image regions without the additional movement; and determining the displacement by preferentially using the at least one image region of the plurality of image regions;

wherein at least one of at least one first image region and at least one second image region is used as a function of a reliability factor for determining the regional displacement to determine the displacement; and wherein for each of the image regions, the regional displacement is determined using block-displacement information from a block-based encoding process by considering the block-displacement information of blocks lying inside a specific image region.

* * * * *